Aug. 16, 1932.   F. MORE   1,871,461
ANTIGLARE DEVICE FOR AUTOMOBILE DRIVERS
Filed Feb. 3, 1932
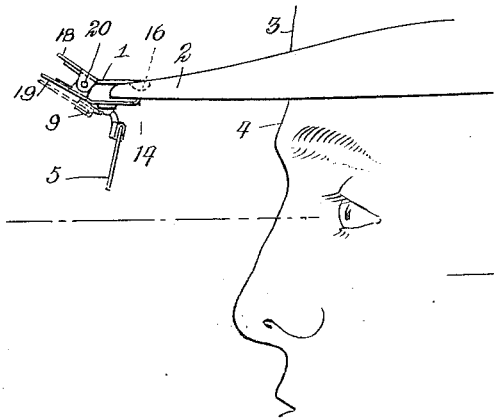
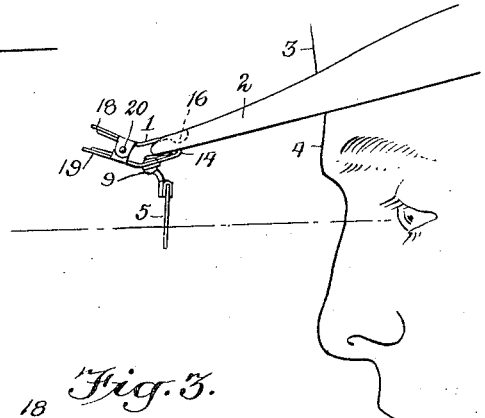
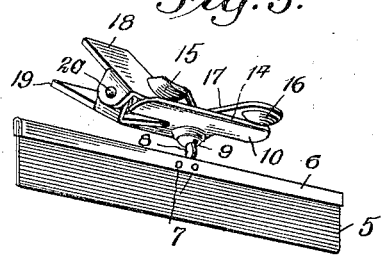
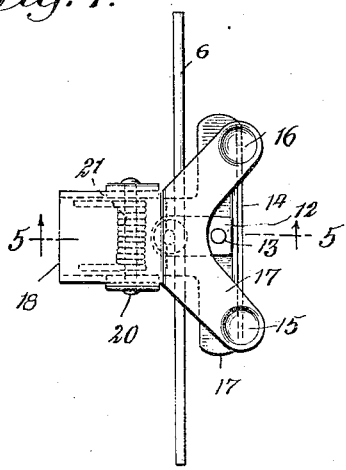
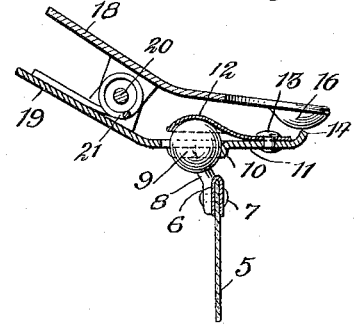
WITNESSES
INVENTOR
Fred More
BY Munn & Co.
ATTORNEYS Patented Aug. 16, 1932

1,871,461

UNITED STATES PATENT OFFICE

FRED MORE, OF HOBART, NEW YORK

ANTIGLARE DEVICE FOR AUTOMOBILE DRIVERS

Application filed February 3, 1932. Serial No. 590,735.

This invention relates to an improved antiglare device for automobile drivers, the object being to provide an improved construction which may be carried by the hat or cap of an automobile driver, and so positioned that the driver may look through the device or look beneath the device at any time.

An additional object of the invention is to provide an attachment for the hat or cap of an automobile driver which will act as an eye screen for screening out certain rays of light from the lamps on an on-coming automobile, or from any other source of light, the structure being such that the screening member may be moved into the line of vision by tilting the head and moved out of the line of vision by moving the head in the opposite direction.

Another object of the invention is to provide a screen device for lights which may be carried by the cap or hat of an automobile driver, the same being so formed as to be readily swung out of the way when not desired.

An additional object is to provide an antiglare device or light screen to be carried by the hat of an automobile driver, the structure being such as to be readily clamped to the hat or cap of the driver without any of the parts projecting into a position to disturb the vision of the driver.

In the accompanying drawing—

Figure 1 is a side view of an anti-glare device disclosing an embodiment of the invention, the same being shown in use and clamped to the brim of a hat, but held out of the line of vision by the position of the hat and head.

Figure 2 is a view similar to Figure 1 but showing the head and hat tilted downwardly until the line of vision is through the screening member, forming part of the anti-glare device.

Figure 3 is an enlarged detail perspective view of the anti-glare device shown in Figure 1.

Figure 4 is a top plan view of the device shown in Figure 3.

Figure 5 is a sectional view through Figure 4 approximately on the line 5—5.

Referring to the accompanying drawing by numerals 1 indicates the device as a whole, which is clamped to the brim 2 of the hat 3, which hat is carried by the head of a person 4. The device 1 is clamped firmly in place, and ordinarily, is not shifted when driving at night except that the head is inclined downwardly when an approaching automobile nears the driver, when the vision of the person indicated by the numeral 4 will be through the screening plate 5, which may be green, amber colored, or other suitably colored celluloid or glass, or other material, which will screen out all or certain of the objectionable rays of light, but will leave sufficient light rays for the driver to properly control his own car. The screening plate 5 is preferably rigidly clamped in a U-shaped clamp 6, and, if desired, may be riveted, soldered, or otherwise secured in place, though ordinarily, the clamping action of the metal member 6 with several punched indentures at intervals is sufficient to hold the parts together. The rivet 7 extends through the parts, as shown particularly in Figures 3 and 5, for firmly clamping the stem 8 to the clamp 6. The stem 8 is rigidly connected with a ball 9, which ball is mounted into a socket 10, pressed from the clamping plate 11. Preferably, the stem 8 is at an angle to the plate 5 so that whenever desired the plate 5 and associated parts may be folded against the handle 19, as indicated in dotted lines in Figure 1. A spring 12 formed of steel, or other resilient material, is rigidly secured to the plate 11 by a suitable rivet 13, and continually acts on ball 9 for pressing the same against the walls of the socket 10, so as to lock or hold the plate 5 in any desired adjusted position. The spring 12 is preferably a flat spring with a cupped upper end fitting over the ball 9 so as to provide a good frictional surface.

From Figure 5, it will be seen that the clamping plate 11 is bent at the outer edge for providing a turned-up edge or bead 14, against which the depending semi-globular members 15 and 16 press when the device is not in use. When the device is in use, these members grip or clamp the brim of a hat, or visor of a cap, to hold the device in place. The members 15 and 16 are preferably formed integral from the bifurcated member 17, which merges into what may be termed the top handle 18 which coacts with the bottom handle 19, said bottom handle being integral with the clamping plate 11. These handles are bent upwardly, as shown in Figure 5, at an appreciable angle from the members 11 and 17, so that when the device is in use, they will not be in the line of vision. The respective handles 18 and 19 are provided with coacting ears for receiving the journaled pin 20 around which the spring 21 is fitted, said spring being arranged so that the ends will act on the handles 18 and 19 for resiliently holding these ends separated, and thereby causing a pinching action between the members 14, 15 and 16.

When the device is to be used it is merely grasped by the handles 18 and 19 and clamped to the hat or other head gear of the driver, preferably, directly in front of the center of the driver's face. The plate 5 is then swung downwardly to substantially the position shown in Figure 1 and is left in that position during the use of the device.

It will be understood that the parts, including the hat 3, are adjusted so that when the driver is holding his head in a normal position for driving, the plate 5 will be above the line of vision, as illustrated in Figure 1. When the driver approaches an on-coming automobile with bright lights, it is only necessary for him to incline his head downwardly a little, or until his vision extends through the plate 5. The plate 5 is preferably sufficiently long so that the vision from both eyes will be through this plate when the plate is depressed, as shown in Figure 2, thus shutting off the undesired rays of light from the lamps of the on-coming automobile. As soon as the on-coming automobile has passed, the driver moves his head back to the normal driving position, as shown in Figure 1.

If the driver should stop the car and remain in the car, or near the car for a short time, he may swing the plate 5 in the dotted position shown in Figure 1, whereby it will not annoy him, as it will be completely out of the zone of his vision, unless he decidedly looks upwardly. When he again starts to drive he merely swings the plate 5 to its operative position, as shown in Figure 1, and then holds his head up or inclines it according to circumstances.

I claim:—

1. An attachment for hats, caps, or the like, including a light screen and means for clamping the light screen to the hat or cap, said means including a clamping structure engaging the hat and means for adjustably mounting the screen on the clamping structure, said means including a ball and socket structure, and a spring acting on the ball for yieldingly holding the same in different adjusted positions, said spring having a cupped end fitting over said ball providing a maximum friction with a minimum pressure.

2. In a device of the character described, a clamp provided with a clamping plate having a turned-up edge, spaced clamping members coacting with said edge for clamping the brim of a hat or visor of a cap, a spring for causing said edge and clamping means to function, said clamping plate being provided with a ball socket, a ball mounted in said socket and provided with an extending stem, a light screen, a clamping member clamping said light screen, means for securing said clamping member to said stem, and means for frictionally holding said ball against movement in said socket.

3. In a device of the character described, a clamping member formed with a pair of clamping structures for clamping the brim of a hat, one of said clamping structures having a pressed-out portion acting as a ball socket, a screen for screening out rays of light, a ball rigidly connected with said screen and positioned in said socket, said ball acting to support the screen in different positions, and a spring formed with a cupped portion frictionally pressing against said ball for frictionally holding the ball in different adjusted positions.

4. In a device of the character described, a light screen, a stem for supporting said screen, a ball rigidly connected to said stem for supporting the stem, said ball adapted to be rotated in any desired direction and thereby shift the postion of said screen to any desired angle, means coacting with said ball for supporting the same on the brim of a hat, and a comparatively flat clamping spring formed with a cupped portion pressing against said ball for frictionally holding the ball in different adjusted positions.

FRED MORE.